(12) United States Patent
Sugihara

(10) Patent No.: US 9,878,749 B2
(45) Date of Patent: Jan. 30, 2018

(54) RUBBER CRAWLER AND RUBBER CRAWLER MANUFACTURING METHOD

(71) Applicant: BRIDGESTONE CORPORATION, Chuo-ku, Tokyo (JP)

(72) Inventor: Shingo Sugihara, Tokyo (JP)

(73) Assignee: BRIDGESTONE CORPORATION, Tokyo (JP)

(*) Notice: Subject to any disclaimer, the term of this patent is extended or adjusted under 35 U.S.C. 154(b) by 104 days.

(21) Appl. No.: 14/767,588

(22) PCT Filed: Feb. 17, 2014

(86) PCT No.: PCT/JP2014/053670
§ 371 (c)(1),
(2) Date: Aug. 13, 2015

(87) PCT Pub. No.: WO2014/126247
PCT Pub. Date: Aug. 21, 2014

(65) Prior Publication Data
US 2016/0016620 A1    Jan. 21, 2016

(30) Foreign Application Priority Data

Feb. 15, 2013  (JP) .................................. 2013-027762
Feb. 15, 2013  (JP) .................................. 2013-027763

(51) Int. Cl.
*B62D 55/24*    (2006.01)
*B29C 33/12*    (2006.01)
(Continued)

(52) U.S. Cl.
CPC ............ *B62D 55/244* (2013.01); *B29C 33/12* (2013.01); *B29C 43/18* (2013.01); *B29D 29/085* (2013.01); *B29L 2029/00* (2013.01)

(58) Field of Classification Search
CPC .... B60D 55/244; B29D 33/085; B29C 43/18; B29L 2029/00
(Continued)

(56) References Cited

U.S. PATENT DOCUMENTS 1,814,046 A * 7/1931 Kegresse ............... B62D 55/24
                                                              305/180
5,447,365 A    9/1995 Muramatsu et al.
(Continued)

FOREIGN PATENT DOCUMENTS

JP    S49-19423 U    2/1974
JP    S54-003479 Y   2/1979
(Continued)

OTHER PUBLICATIONS

Yokoo, Katsuaki, "Low-Vibration Crawler", Journal of Technical Disclosure, Japan Institute of Invention and Innovation, No. 2001-6052, Nov. 15, 2001 (Japan).
(Continued)

Primary Examiner — S. Joseph Morano
Assistant Examiner — Jean Charleston
(74) Attorney, Agent, or Firm — Solaris Intellectual Property Group, PLLC

(57) ABSTRACT

A rubber crawler includes: a rubber belt serving as an example of an endless rubber body entrained around plural wheels; plural rubber projections that are formed at the rubber belt at intervals around a crawler peripheral direction of the rubber belt, that project toward an inner peripheral side of the rubber belt, and that limit movement of the wheels in a crawler width direction through contact; and at least one metal member embedded in each rubber projection, the at least one metal member raising a rigidity of the rubber projection in the crawler width direction, and including a portion that is exposed from the rubber projection.

10 Claims, 6 Drawing Sheets

(51) Int. Cl.
*B29C 43/18* (2006.01)
*B29D 29/08* (2006.01)
*B29L 29/00* (2006.01)

(58) Field of Classification Search
USPC ....... 305/157, 165, 166, 167, 169, 170, 173, 305/174, 175, 193, 194, 195
See application file for complete search history.

(56) References Cited

U.S. PATENT DOCUMENTS

| | | | |
|---|---|---|---|
| 5,540,489 A | | 7/1996 | Muramatsu et al. |
| 5,984,438 A | * | 11/1999 | Tsunoda ................. B62D 55/24 305/169 |
| 6,079,802 A | * | 6/2000 | Nishimura ........... B62D 55/244 305/157 |
| 6,176,557 B1 | * | 1/2001 | Ono ..................... B62D 55/244 305/173 |
| 6,196,646 B1 | * | 3/2001 | Edwards .............. B62D 55/244 305/167 |
| 7,625,050 B2 | * | 12/2009 | Bair ....................... B62D 55/24 305/169 |
| 8,857,924 B2 | * | 10/2014 | Reshad ................ B62D 55/244 305/160 |
| 9,004,618 B1 | * | 4/2015 | Delisle ................. B62D 55/244 305/162 |

FOREIGN PATENT DOCUMENTS

| | | |
|---|---|---|
| JP | H06-72362 A | 3/1994 |
| JP | 2502513 Y | 6/1996 |
| JP | 2000-210948 A | 8/2000 |
| JP | 2004-330830 A | 11/2004 |
| JP | 2006-189062 A | 7/2006 |
| JP | 2010-254106 A | 11/2010 |
| JP | 4575095 B | 11/2010 |
| JP | 2012-166714 A | 9/2012 |

OTHER PUBLICATIONS

Office Action issued in corresponding Japanese Patent Application No. 2013-027762 dated Apr. 8, 2014.
Office Action issued in corresponding Japanese Patent Application No. 2013-027762 dated Sep. 9, 2014.
Office Action issued in corresponding Japanese Patent Application No. 2013-027763 dated Apr. 15, 2014.
Office Action issued in corresponding Japanese Patent Application No. 2013-027763 dated Sep. 24, 2014.

* cited by examiner

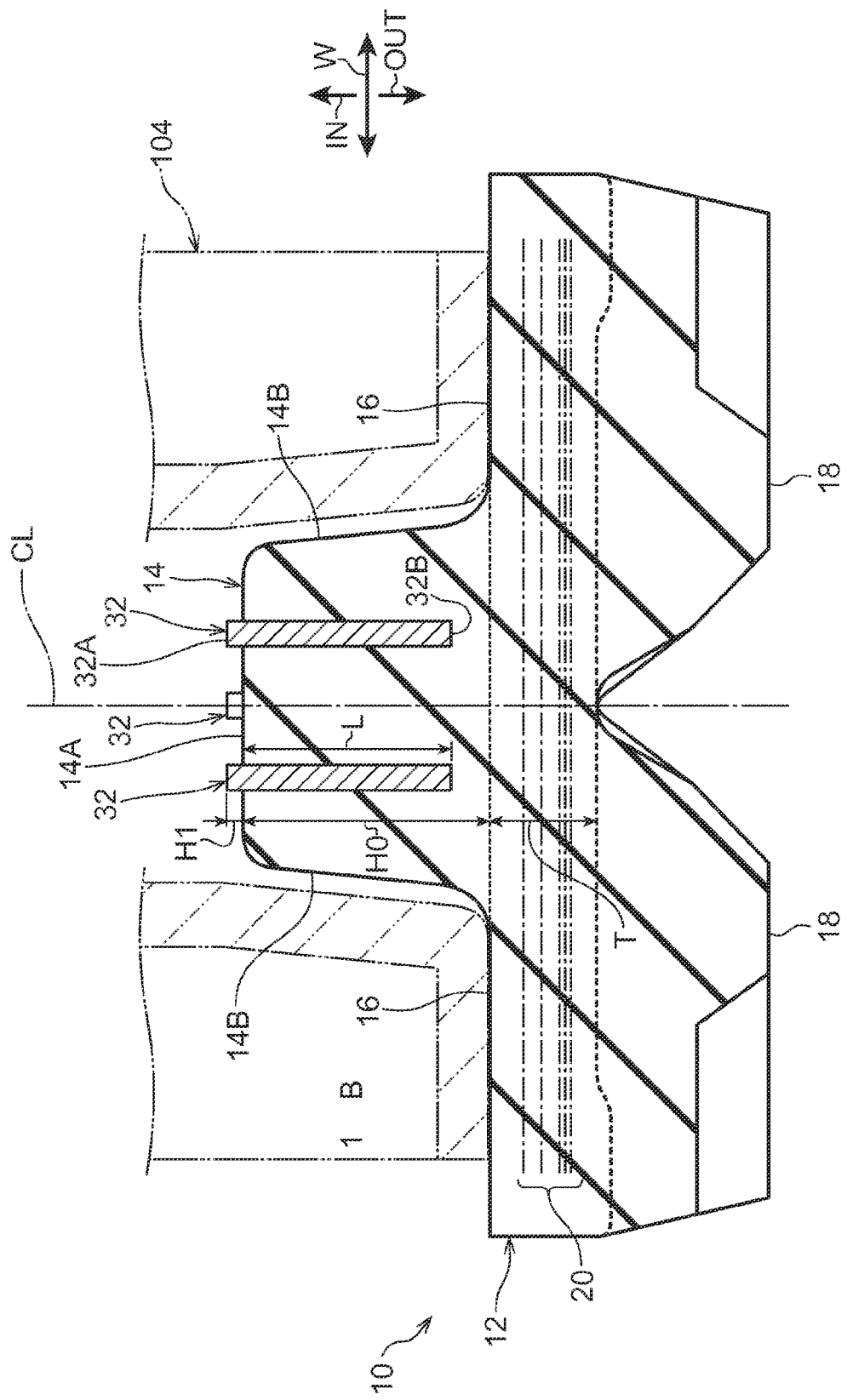

RUBBER CRAWLER AND RUBBER CRAWLER MANUFACTURING METHOD

TECHNICAL FIELD

The present invention relates to a rubber crawler and a rubber crawler manufacturing method.

BACKGROUND ART

Rubber crawlers include friction-driven rubber crawlers, in which an outer circumferential face of a drive wheel on a vehicle body side is placed in contact with an inner peripheral face of a rubber crawler, and drive force is transmitted from the drive wheel to the rubber crawler by frictional force between the two. In this type of rubber crawler, rubber projections for guiding wheels, including the drive wheel, idle wheels, and rollers, are provided at specific intervals along the inner peripheral face of the rubber crawler.

In the rubber projections, there is a tendency toward increasing the projection length in the crawler peripheral direction, the projection width in the crawler width direction, and the projection height from the inner peripheral face of the crawler, from the perspectives of suppressing wear due to contact with the wheels, and preventing disengagement from the wheels.

When the size of the rubber projections is increased, the last points to be vulcanized (where the cumulative amount of heat from the mold is smallest) during vulcanization of the rubber crawler are deep within the rubber projections. In order to realize specific material properties of the rubber in the rubber crawler, vulcanization needs to continue until the last points to be vulcanized have undergone a specific degree of vulcanization. However, there is also a need to perform vulcanization at low temperature in order to avoid over-curing the rubber. The vulcanization time increases as a result.

A rubber crawler described in Japanese Patent Application Laid-Open (JP-A) No. 2004-330830 achieves a reduction in vulcanization time by disposing a composite layer containing metal fibers inside a rubber projection to raise the thermal conductivity of the rubber projection.

SUMMARY OF INVENTION

Technical Problem

In the rubber crawler described in JP-A No. 2004-330830, the composite layer containing metal fibers is disposed inside the rubber projection, thereby increasing the rigidity of the rubber projection.

However, further room for improvement remains with regard to increasing the rigidity of the rubber projection with respect to thrust force from the wheels.

An object of the present invention is to provide a friction-driven rubber crawler and a rubber crawler manufacturing method capable of reducing vulcanization time, while suppressing the occurrence of defects in a rubber projection.

Solution to Problem

A rubber crawler of a first aspect of the present invention includes an endless rubber body entrained around plural wheels; plural rubber projections that are formed at the rubber body at intervals around a peripheral direction of the rubber body, that project toward an inner peripheral side of the rubber body, and that limit movement of the wheels in a rubber body width direction through contact; and at least one metal member embedded in each rubber projection, the at least one metal member raising a rigidity of the rubber projection in the rubber body width direction, and that including a portion that is exposed from the rubber projection.

A rubber crawler manufacturing method of a second aspect of the present invention is a rubber crawler manufacturing method to manufacture the rubber crawler of the first aspect, the rubber crawler manufacturing method including: a rubber segment piece forming process of forming, for each rubber projection, plural rubber segment pieces of an unvulcanized rubber projection piece that will form the rubber projection segmented at least one position where the at least one metal member will be embedded; a rubber projection piece assembly process of assembling, for each rubber projection, the rubber projection piece by joining segment faces of the plural rubber segment pieces together while fitting the at least one metal member into respective fitting recesses formed in the segment face of each of the rubber segment pieces; and a vulcanization process of vulcanizing, for each rubber projection, the rubber projection piece to form the rubber projection.

Advantageous Effects of Invention

As described above, the present invention is capable of providing a rubber crawler and a rubber crawler manufacturing method enabling a reduction in vulcanization time, while suppressing the occurrence of defects in the rubber projection.

BRIEF DESCRIPTION OF DRAWINGS

FIG. 3 is a cross-section taken along line 3X-3X in FIG. 2.

DESCRIPTION OF EMBODIMENTS

First Exemplary Embodiment

Explanation follows regarding a rubber crawler according to a first exemplary embodiment of the present invention.

As an example of a rubber crawler according to the first exemplary embodiment, an endless rubber crawler 10 is what is known as a coreless rubber crawler that does not have cores.

Figure 1:
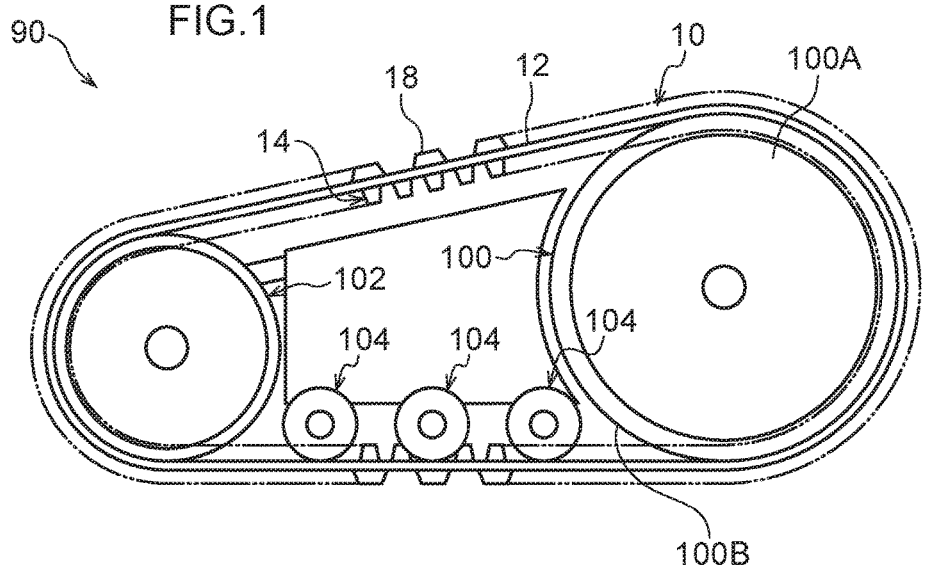
FIG. 1 is a side view illustrating a state in which a rubber crawler of a first exemplary embodiment is entrained around a drive wheel and an idle wheel, as viewed along a crawler width direction.

As illustrated in FIG. 1, the rubber crawler 10 is entrained around a drive wheel 100 that is coupled to a drive shaft of a tracked vehicle (for example, a large agricultural machine or paving machine) serving as a machine body, and an idle wheel 102 that is attached to the tracked vehicle so as to be capable of rotating freely. Plural rollers 104 (see FIG. 1 and FIG. 3) that are disposed between the drive wheel 100 and the idle wheel 102, and that are attached to the tracked vehicle so as to be capable of rotating freely, are configured to roll at the inner periphery of the rubber crawler 10. The drive wheel 100, the idle wheel 102, and the rollers 104 are examples of wheels of the present invention.

In the present exemplary embodiment, the peripheral direction of the endless rubber crawler 10 (the arrow S direction in FIG. 2) is referred to as the "crawler peripheral direction", and the width direction of the rubber crawler 10 (the arrow W direction in FIG. 2) is referred to as the "crawler width direction". The crawler peripheral direction and the crawler width direction are orthogonal to each other as viewed from the inner peripheral side or the outer peripheral side of the rubber crawler 10 (see FIG. 2).

In the present exemplary embodiment, the inner peripheral side of the rubber crawler 10 that is entrained around the drive wheel 100 and the idle wheel 102 in a loop (the arrow IN direction side in FIG. 3) is referred to as the "crawler inner peripheral side", and the outer peripheral side of the rubber crawler 10 (the arrow OUT direction side in FIG. 3) is referred to as the "crawler outer peripheral side". The arrow IN direction (the direction toward the inside of the loop) and the arrow OUT direction in FIG. 3 (the direction toward the outside of the loop) indicate the inward and outward directions of the rubber crawler 10 in an entrained state.

The drive wheel 100, the idle wheel 102, the rollers 104, and the rubber crawler 10 entrained around the drive wheel 100 and the idle wheel 102 configure a crawler moving apparatus 90, serving as a travelling section of the tracked vehicle (see FIG. 1).

As illustrated in FIG. 1, the drive wheel 100 includes a pair of disk shaped wheel sections 100A coupled to the drive shaft of the tracked vehicle. Outer circumferential faces 100B of the respective wheel sections 100A roll in contact with wheel-turned faces 16 of the rubber crawler 10, described later. The drive wheel 100 causes drive force of the tracked vehicle to act on the rubber crawler 10 (detailed explanation to follow), thereby cycling the rubber crawler 10 between the drive wheel 100 and the idle wheel 102.

Figure 2:
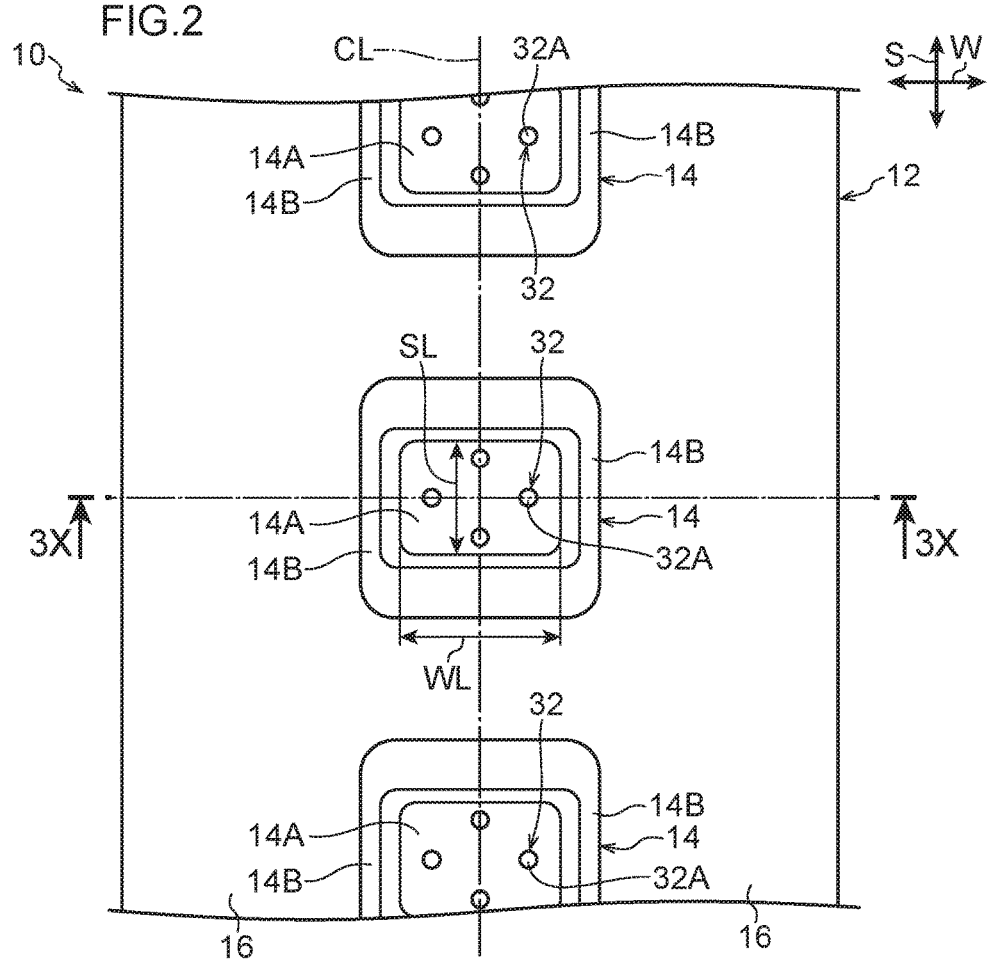
FIG. 2 is a plan view of the inner periphery of a rubber crawler of the first exemplary embodiment, as viewed from the inner peripheral side of the crawler.

As illustrated in FIG. 1, the rubber crawler 10 includes a rubber belt 12 formed in an endless belt shape from a rubber material. The rubber belt 12 of the present exemplary embodiment is an example of an endless rubber body of the present invention. The peripheral direction, width direction, inner peripheral side, and outer peripheral side of the rubber belt 12 of the present exemplary embodiment correspond to the crawler peripheral direction, the crawler width direction, the crawler inner peripheral side, and the crawler outer peripheral side respectively. As illustrated in FIG. 1 and FIG. 2, plural rubber projections 14 that project out toward the crawler inner peripheral side are formed at intervals around the crawler peripheral direction at the inner periphery of the rubber belt 12. The rubber projections 14 are disposed at the crawler width direction center of the rubber belt 12, and contact the wheels (the roller 104 in FIG. 3) that the wheel-turned faces 16, described later, roll over, so as to limit movement in the crawler width direction. Specifically, side faces of the wheels contact width direction wall faces 14B in the crawler width direction of the rubber projections 14. The rubber projections 14 are formed from the same rubber material as the rubber belt 12, or from a harder rubber material than the rubber belt 12.

As illustrated in FIG. 3, a projection height H0 of the rubber projections 14 has a greater value than a thickness T of the rubber belt 12 at portions corresponding to the rubber projections 14. The projection height H0 of the rubber projections 14 and the thickness T of the rubber belt 12 are both values measured along a crawler in-out direction.

As illustrated in FIG. 2 and FIG. 3, the respective wheel-turned faces 16 are formed extending around the crawler peripheral direction on both crawler width direction sides of the rubber projections 14 of the rubber belt 12.

In the present exemplary embodiment, the wheel-turned faces 16 and portions to the outside thereof are configured in the same plane as each other at the inner periphery of the rubber belt 12; however the configuration of the present invention is not limited thereto, and the wheel-turned faces 16 may protrude toward the crawler inner peripheral side.

The outer peripheral side of the rubber belt 12 is formed with plural lugs 18 that contact the ground. Moreover, a belt layer 20 extending around the crawler peripheral direction in an endless belt shape is embedded inside the rubber belt 12. The belt layer 20 of the present exemplary embodiment is configured by a multiple ply belt.

As illustrated in FIG. 3, metal members 32, each formed in a bar shape from a metal material with excellent thermal conductivity (for example, steel or aluminum) are embedded in the rubber projections 14. Each of the metal members 32 extends from an apex face 14A side to a base side of the rubber projection 14. Embedding (orienting) the metal members 32 along the crawler in-out direction enables the rigidity (for example, bending rigidity) of the rubber projections 14 to be raised in the crawler peripheral direction and the crawler width direction. Part of each metal member 32 is exposed from the rubber projection 14. The metal members 32 are an example of a metal member of the present invention.

One end portion 32A in the extension direction of each of the metal members 32 is exposed from the apex face 14A, and the other end portion 32B in the extension direction is disposed at a position lower than half the projection height H0 of the rubber projection 14. The one end portion 32A of each metal member 32 projects out from the apex face 14A of the rubber projection 14. A projection amount H1 of the one end portion 32A of the metal member 32 from the apex face 14A (see FIG. 3) is preferably set in a range of between 0 mm and 15 mm. The other end portion 32B of the metal member 32 is disposed within a range of projection height $H0/2 \leq L \leq ((\text{projection height } H0 + \text{thickness T of the rubber belt } 12)/2) + 10$ mm, wherein L is the distance from the apex face 14A of the rubber projection 14 to the other end portion 32B.

The outer periphery of each metal member 32 has a curved line shape in cross-section taken in a direction orthogonal to the extension direction (referred to below simply as the "orthogonal cross-section"). The metal member 32 of the present exemplary embodiment is configured in a bar shape with a circular cross-section profile, namely, in a circular column shape. Note that the outer periphery of the metal member 32 of the present invention may have any shape in orthogonal cross-section, as long as it is a curved line shape. For example, the cross-section profile may be an elliptical shape, or may be a polygonal shape with the corners configured in circular arc shapes.

As illustrated in FIG. 2, plural of the metal members 32 (four in the present exemplary embodiment) are embedded in each rubber projection 14. Some of these metal members 32 (two in the present exemplary embodiment) are disposed in the rubber projection 14 at intervals in the crawler width direction.

When SL is the crawler peripheral direction length of the apex face 14A of the rubber projection 14, and WL is the crawler width direction width of the apex face 14A, the respective metal members 32 are preferably disposed at positions at ¼ and ¾ of the apex face length SL, and at positions at ¼ and ¾ of the apex face width WL (with a total of four disposed).

In cases in which only a single metal member 32 is embedded in each rubber projection 14, the metal member 32 is preferably disposed at the center (center in the crawler peripheral direction and center in the crawler width direction) of the apex face 14A of the rubber projection 14.

The number of the metal members 32 embedded in each rubber projection 14 is not particularly limited, and any number thereof may be embedded in each rubber projection 14 as long the speed at which vulcanization progresses is substantially the same speed in the rubber projection 14 and the rubber belt 12, as described later.

Next, explanation follows regarding a manufacturing method of the rubber crawler 10 of the present exemplary embodiment.

Figure 4A:
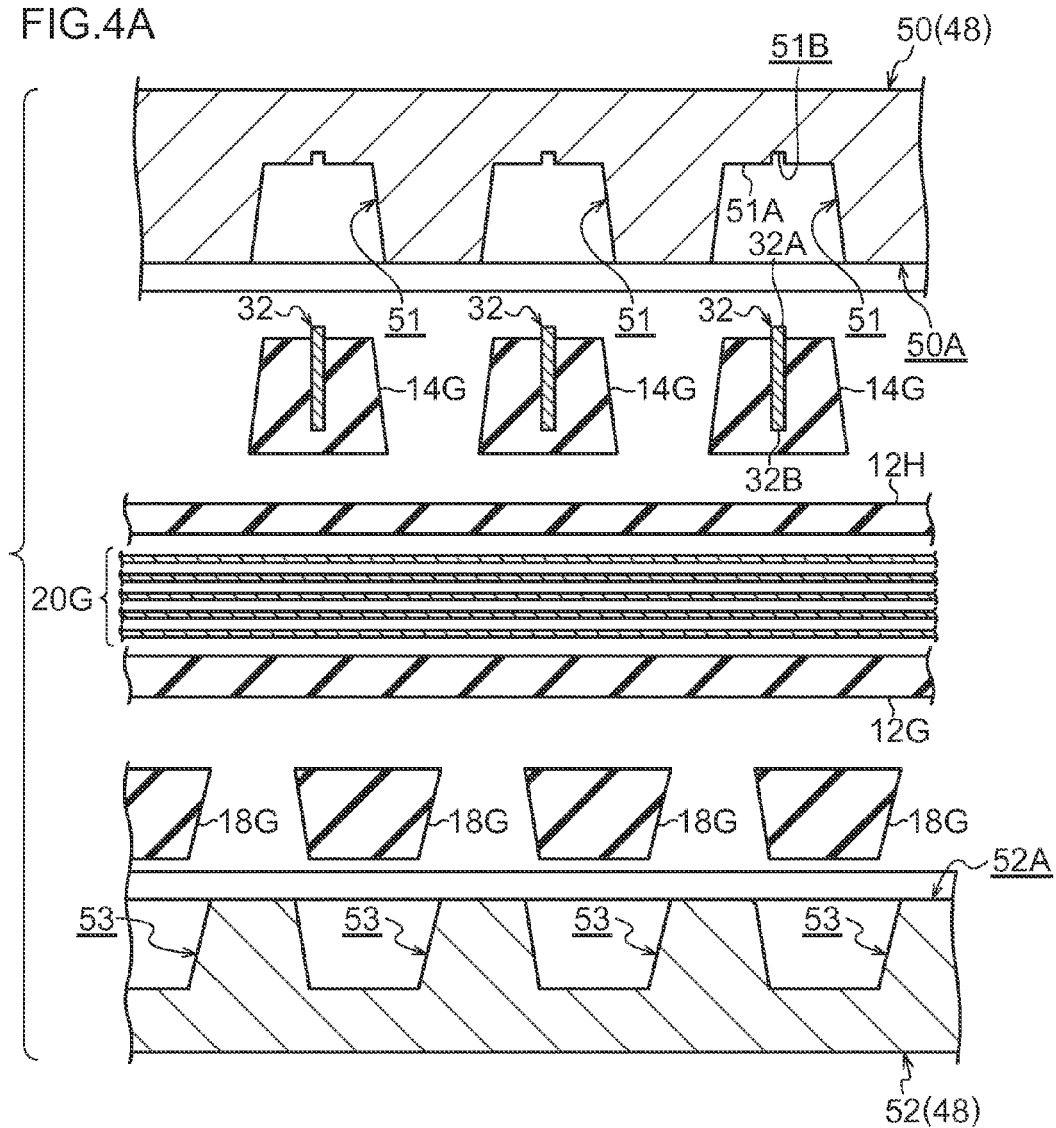
FIG. 4A is an explanatory diagram to explain a manufacturing method of a rubber crawler of the first exemplary embodiment.

As illustrated in FIG. 4A, a mold 48, which will be explained in more detail in the second exemplary embodiment, is employed in manufacture of the rubber crawler 10. Specifically, an upper mold 50 formed with rubber projection recesses 51 corresponding to the rubber projections 14, and a lower mold 52 formed with lug recesses 53 corresponding to the lugs 18, are employed to perform integral vulcanization of the rubber belt 12, the rubber projections 14, and the lugs 18. Bottom faces 51A configuring the rubber projection recesses 51 of the upper mold 50 are formed with positioning recesses 51B at positions corresponding to the one end portions 32A of the metal members 32.

During vulcanization molding, unvulcanized rubber lug pieces 18G for forming the lugs 18 are set in the lug recesses 53 of the lower mold 52, over which an unvulcanized rubber sheet 12G for forming an outer peripheral portion of the rubber belt 12, plural unvulcanized belt plies 20G for forming the belt layer, and an unvulcanized rubber sheet 12H for forming an inner peripheral portion of the rubber belt 12, are stacked in sequence.

Figure 4B:
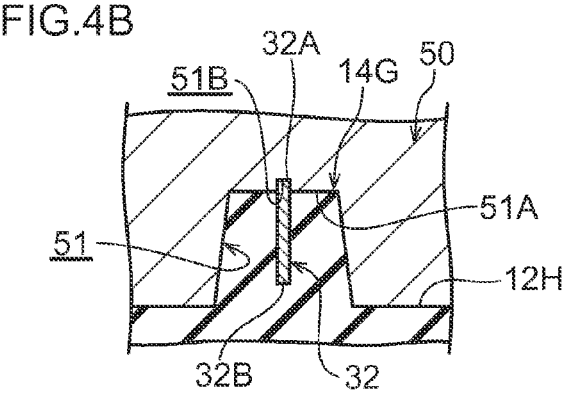
FIG. 4B is an explanatory diagram to explain a state in which a rubber projection piece has been set in a mold in the first exemplary embodiment.

As illustrated in FIG. 4B, plural unvulcanized rubber projection pieces 14G for forming the rubber projection 14, in which the plural metal members 32 (four in the present exemplary embodiment) are embedded, are set in the rubber projection recesses 51 of the upper mold 50, positioned such that the one end portions 32A of the metal members 32 fit into the positioning recesses 51B. The upper mold 50 and the lower mold 52 are then closed, and vulcanization processing is performed for a specific duration and at a specific temperature. The rubber crawler 10 of the present exemplary embodiment is complete once the vulcanization processing has finished.

Explanation follows regarding operation and advantageous effects of the rubber crawler 10 of the present exemplary embodiment.

In the rubber crawler 10, the metal members 32 are embedded in the rubber projections 14, and part of each metal member 32 is exposed from the rubber projection 14, enabling heat from the upper mold 50 to be transmitted through the metal members 32 to deep within (a deep portion of) the rubber projection 14 during vulcanization processing. The respective speeds at which vulcanization progresses in the rubber belt 12 and the rubber projections 14 can thus be brought closer together, thereby enabling high temperature vulcanization, and enabling a reduction in vulcanization time.

In particular, since large-scale agricultural machinery and paving machinery requires large size rubber projections 14 such as in the rubber crawler 10 (for example, the the projection height H0 of the rubber projection 14 has a greater value than the thickness T of the rubber belt 12), there is a tendency toward long vulcanization times. However, embedding the metal members 32 in the rubber projections 14 as described above enables a reduction in the vulcanization time.

Embedding the metal members 32 in the rubber projections 14 in the rubber crawler 10 raises the rigidity (bending rigidity) of the rubber projections 14 in at least the crawler width direction. During travel (for example when turning), the rubber projections 14 are therefore not liable to bend, even when the rubber projections 14 are subjected to thrust force from the wheels (the drive wheel 100, the idle wheel 102, and the rollers 104). Namely, resilient deformation of the rubber projections 14 due to thrust force from the wheels can be suppressed. As a result, the wheels are suppressed from striking the vicinity of corner portions of the rubber projections 14 during travel, enabling the occurrence of defects (such as chipped rubber) to be suppressed in the rubber projections 14.

The rubber crawler 10 accordingly enables a reduction in vulcanization time, while suppressing the occurrence of defects in the rubber projections 14.

The durability of the rubber crawler 10 is thereby increased due to suppressing the occurrence of defects in the rubber projection 14.

Manufacturing costs of the rubber crawler can be reduced due to a reduction in electricity consumption and the like as a result of reducing the vulcanization time.

In the rubber crawler 10, the one end portions 32A of the metal members 32 are exposed at the apex faces 14A of the rubber projections 14, these being portions that do not contact the wheels during travel. This thereby enables defects due to contact between the metal members 32 and the wheels, such as the occurrence of cracks at boundaries between the metal members 32 and the rubber projections 14, to be suppressed.

Heat from the upper mold 50 can be transmitted deep within the rubber projections 14 due to the other end portions 32B of the metal members 32 being disposed at positions lower than half the projection height H0 of the rubber projections 14.

The bending rigidity of the rubber projections 14 is further increased since the metal members 32 extend from the apex face 14A side to the base side of the rubber projections 14, and the other end portions 32B are disposed at positions lower than half the projection height H0 of the rubber projections 14.

The one end portions 32A of the metal members 32 project out from the apex faces 14A of the rubber projections 14, thereby enabling the metal members 32 to be positioned in the upper mold 50 by fitting the one end portions 32A into the positioning recesses 51B of the upper mold 50 (see FIG. 4B), and enabling positional displacement of the metal members 32 due to the flow of rubber during vulcanization molding to be prevented.

The outer periphery of each metal member 32 has a curved line shape in orthogonal cross-section, thereby enabling concentration of distortion in the outer periphery of the metal members 32 to be suppressed.

Moreover, plural of the metal members 32 are embedded in each rubber projection 14 at intervals in the crawler width direction. Adjacent metal members 32 in the crawler width direction accordingly support each other through the rubber between them, thereby enabling the rigidity of the rubber projections 14 in the crawler width direction to be further increased.

As illustrated in FIG. 3, in the first exemplary embodiment the one end portions 32A of the metal members 32 are configured projecting out from the apex faces 14A of the rubber projections 14, thus preventing positional displacement of the metal members 32 due to rubber flowing during vulcanization molding; however, the present invention is not limited to such a configuration. The one end portions 32A of the metal members 32 may be configured in the same plane as the apex faces 14A of the rubber projections 14. Such a configuration enables improved appearance of the apex faces 14A of the rubber projections 14.

As illustrated in FIG. 3, in the first exemplary embodiment, the one end portions 32A of the metal members 32 are exposed from the apex faces 14A of the rubber projections 14; however, the present invention is not limited thereto. Configuration may be made such that the one end portion 32A side of each metal member 32 is bent toward a peripheral wall face in the crawler peripheral direction, such that the one end portion 32A is exposed from the peripheral wall face of the rubber projection 14. Note that since the peripheral wall faces of the rubber projections 14 do not normally contact the wheels when traveling, the one end portions 32A of the metal member 32 do not make direct contact with the wheels, even when the one end portions 32A are exposed from the peripheral wall faces.

As illustrated in FIG. 2, in the first exemplary embodiment, configuration is made in which the metal members 32 embedded in the rubber projections 14 are substantially circular column shaped; however, the present invention is not limited thereto, and the metal members 32 embedded in the rubber projection 14 may be of any shape, such as a rectangular plate shape. Forming the metal members 32 in such rectangular plate shapes enables increased bending rigidity of the rubber projections 14 in the plate thickness direction of the metal members 32.

In the first exemplary embodiment, the metal members 32 are configured in substantially circular column shapes; however, the present invention is not limited thereto, and the metal member 32 may have substantially circular tube shapes. In such cases, the inside of the circular tube shaped metal members are preferably filled with the rubber material configuring the rubber projection 14. Such a configuration enables efficient transmission of heat from the mold to the rubber material that is filled inside the hollow portion in an unvulcanized state during manufacture. Configuring the metal members 32 in circular tube shapes enables secondary cross-sectional moment to be secured without increasing the weight of the metal members 32, and enables the rigidity of the rubber projections 14 in the crawler width direction to be increased. The metal members 32 may also be configured in circular tube shapes from which a portion has been cut away, namely in C shapes.

Second Exemplary Embodiment

Figure 5:
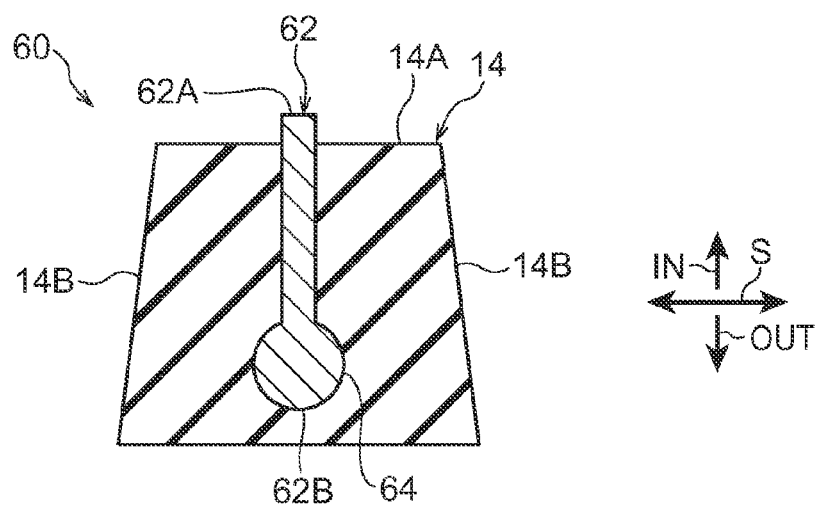
FIG. 5 is a cross-section taken along the crawler peripheral direction, illustrating a rubber projection embedded with a metal member in a rubber crawler of a second exemplary embodiment.
Figure 6:
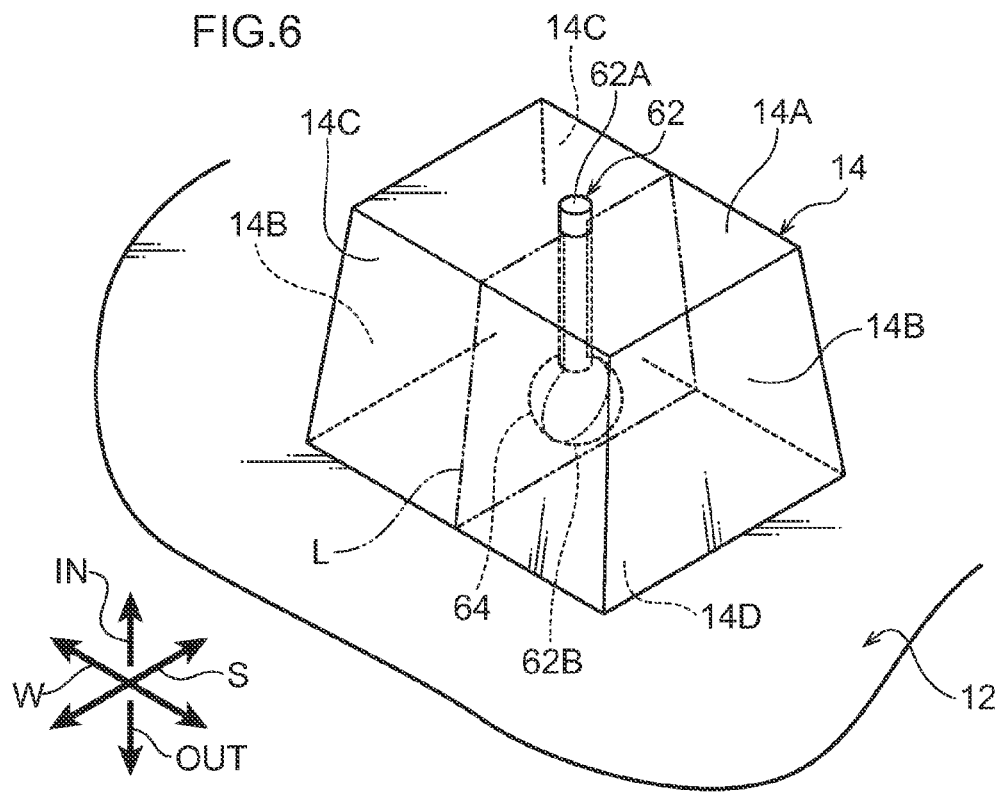
FIG. 6 is an enlarged perspective view illustrating a rubber projection of a rubber crawler manufactured by a rubber crawler manufacturing method of the second exemplary embodiment.

Next, explanation follows regarding a rubber crawler according to a second exemplary embodiment of the present invention, with reference to FIG. 5 and FIG. 6. Configurations equivalent to those of the first exemplary embodiment are allocated the same reference numerals, and explanation thereof is omitted. As illustrated in FIG. 5 and FIG. 6, a rubber crawler 60 of the present exemplary embodiment has the same configuration as the rubber crawler 10 of the first exemplary embodiment, with the exception of the configuration of a metal member 62 embedded in the rubber projection 14. Explanation accordingly follows regarding the configuration of the metal member 62.

As illustrated in FIG. 5 and FIG. 6, the metal member 62 extends from the apex face 14A side to the base side of the rubber projection 14, and one end portion 62A in the extension direction projects out from the apex face 14A. A portion of the metal member 62 that is embedded in the rubber projection 14 is formed with a bulbous portion 64, serving as an anti-removal portion (known as an anchor), to suppress pull-out from the rubber projection 14. The bulbous portion 64 is substantially spherical in shape, and is formed at another end portion 62B in the extension direction of the metal member 62.

Next, explanation follows regarding operation and advantageous effects of the rubber crawler 60 of the second exemplary embodiment. Explanation regarding similar operation and advantageous effects of the present exemplary embodiment that are similar to the operation and advantageous effects of the first exemplary embodiment is omitted as appropriate.

In the rubber crawler 60, the bulbous portion 64, serving as an anti-removal portion, is formed to the portion of the metal member 62 that is embedded in the rubber projection 14 to suppress pull-out from the rubber projection 14. This thereby enables pull-out of the metal member 62 from the rubber projection 14 that is subject to thrust force from the plural wheels during travel to be suppressed.

Concentration of distortion at the other end portion (bulbous portion 64) can also be suppressed due to forming the substantially spherical shaped bulbous portion 64 at the other end portion in the extension direction of the metal member 62.

Moreover, vulcanization of the rubber projection 14 is promoted since the bulbous portion 64 (the other end portion in the extension direction), this being a jutting out portion of the metal member 62, is disposed deep within the rubber projection 14.

Next, explanation follows regarding a manufacturing method for manufacturing the rubber crawler 60 of the present exemplary embodiment.

In manufacture of the rubber crawler 60, first, respective rubber crawler configuration members that will configure the rubber crawler 60 are manufactured. The rubber crawler configuration members referred to here are the unvulcanized rubber sheet 12H that forms the crawler inner peripheral side of the rubber belt 12 after vulcanization, the unvulcanized rubber sheet 12G that likewise forms the crawler outer peripheral side of the rubber belt 12, the unvulcanized rubber lug pieces 18G that form the lugs 18 after vulcanization, the unvulcanized rubber projection pieces 14G that form the rubber projections 14 after vulcanization, and the unvulcanized belt plies 20G that form the belt layer after vulcanization (see FIG. 8A). Detailed explanation follows regarding manufacturing processes of the rubber projection pieces 14G.

Rubber Segment Piece Forming Process

Figure 7:
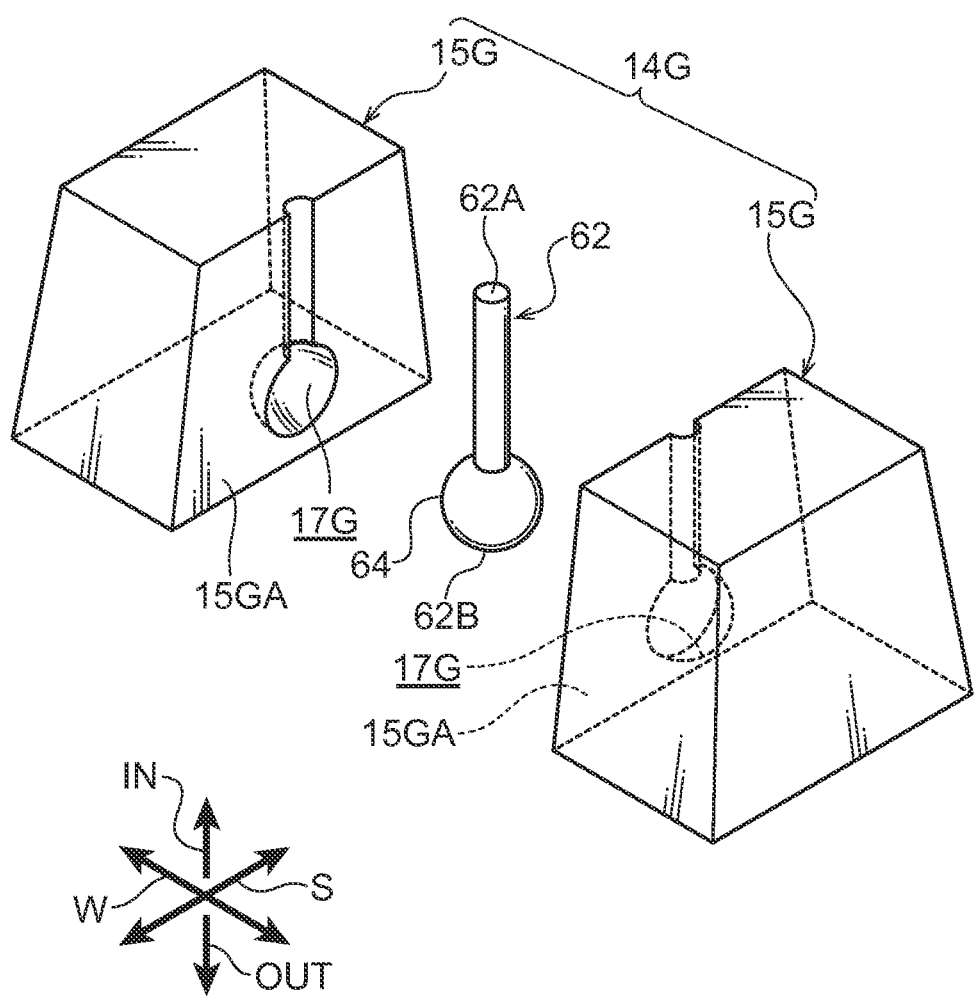
FIG. 7 is a perspective view to explain a rubber projection piece assembly process of a rubber crawler manufacturing method of the second exemplary embodiment.

Firstly, as illustrated in FIG. 7, plural rubber segment pieces 15G configuring the rubber projection pieces 14G are manufactured. Specifically, each rubber projection piece 14G is segmented into plural rubber segment pieces 15G (two segments in the crawler width direction in the present exemplary embodiment) at a position where the metal member 62 is to be embedded. The two rubber segment pieces 15G are the same shape as each other in the present exemplary embodiment.

Segment faces 15GA of both rubber segment pieces 15G are each formed with a fitting recess 17G substantially matching the shape of half of the metal member 62 to be fitted in. Specifically, the shape of each fitting recess 17G corresponds to the shape of one side of the metal member 62 when cut in half along its axial direction.

In the present exemplary embodiment, the fitting recesses 17G of the rubber segment pieces 15G are formed such that the one end portion 62A of the metal member 62 projects out from the apex face 14A of the rubber projection 14. As described later, the one end portion 62A of the metal member 62 preferably projects out from the apex face 14A of the rubber projection 14 far enough to be inserted into the positioning recess 51B of the upper mold 50. As an example, the projection amount of the one end portion 62A from the apex face 14A is preferably set at 15 mm or less.

The rubber segment pieces 15G are formed such that a join L (illustrated by a double dotted intermittent line in FIG. 6) between the segment faces 15GA of mutually adjacent rubber segment pieces 15G is positioned at wall faces other than the width direction wall faces 14B of the rubber projection 14.

Note that the "wall faces other than the width direction wall faces 14B of the rubber projection 14" referred to here are peripheral direction wall faces 14C in the rubber crawler peripheral direction of the rubber projection 14, the apex face 14A (the wall face at the apex) of the rubber projection 14, and a bottom face 14D of the rubber projection 14 (the wall face at the bottom). The bottom face 14D corresponds to the boundary between the rubber projection 14 and the rubber belt 12.

The rubber segment pieces 15G are manufactured by filling unvulcanized rubber material into a rubber segment piece mold (not illustrated in the drawings) formed with a cavity (not illustrated in the drawings) of the same shape as the rubber segment pieces 15G, closing the rubber segment piece mold, and pressing the unvulcanized rubber material inside the recess.

Note that the rubber segment pieces 15G may be manufactured by injecting unvulcanized rubber material into the cavity of the rubber segment piece mold from an extruder (not illustrated in the drawings) at high pressure.

In the present exemplary embodiment, the segment faces 15GA of the rubber segment pieces 15G are formed with flat profiles, with the exception of the fitting recesses 17G.

Rubber Projection Piece Assembly Process

Next, as illustrated in FIG. 7, the rubber projection piece 14G is assembled by joining together the segment faces 15GA of the plural (two in the present exemplary embodiment) rubber segment pieces 15G while fitting the metal member 62 into the fitting recesses 17G of the segment faces 15GA of the rubber segment pieces 15G. The rubber projection pieces 14G are thus manufactured.

The segment faces 15GA of the plural rubber segment pieces 15G may be joined together by coating the segment faces 15GA of the rubber segment pieces 15G with an adhesive employing a diene-based polymer. When the segment faces 15GA are coated with such an adhesive, a thermal reaction during vulcanization increases the bonding force of the adhesive employing a diene-based polymer, firmly joining the adjacent rubber segment pieces 15G together.

Note that another generic rubber adhesive may be employed as the adhesive to join together the segment faces 15GA of the adjacent rubber segment pieces 15G, instead of an adhesive employing a diene-based polymer.

In FIG. 7, the arrow W direction indicates the crawler width direction, and the arrow S direction indicates the crawler peripheral direction (in other words, the crawler length direction). An apex face, width direction wall faces, peripheral direction wall faces, and bottom face of each rubber projection piece 14G respectively correspond to the apex face 14A, the width direction wall faces 14B, the peripheral direction wall faces 14C, and the bottom face 14D of the rubber projection 14 after vulcanization of the rubber projection pieces 14G.

Vulcanization Process

Figure 8A:
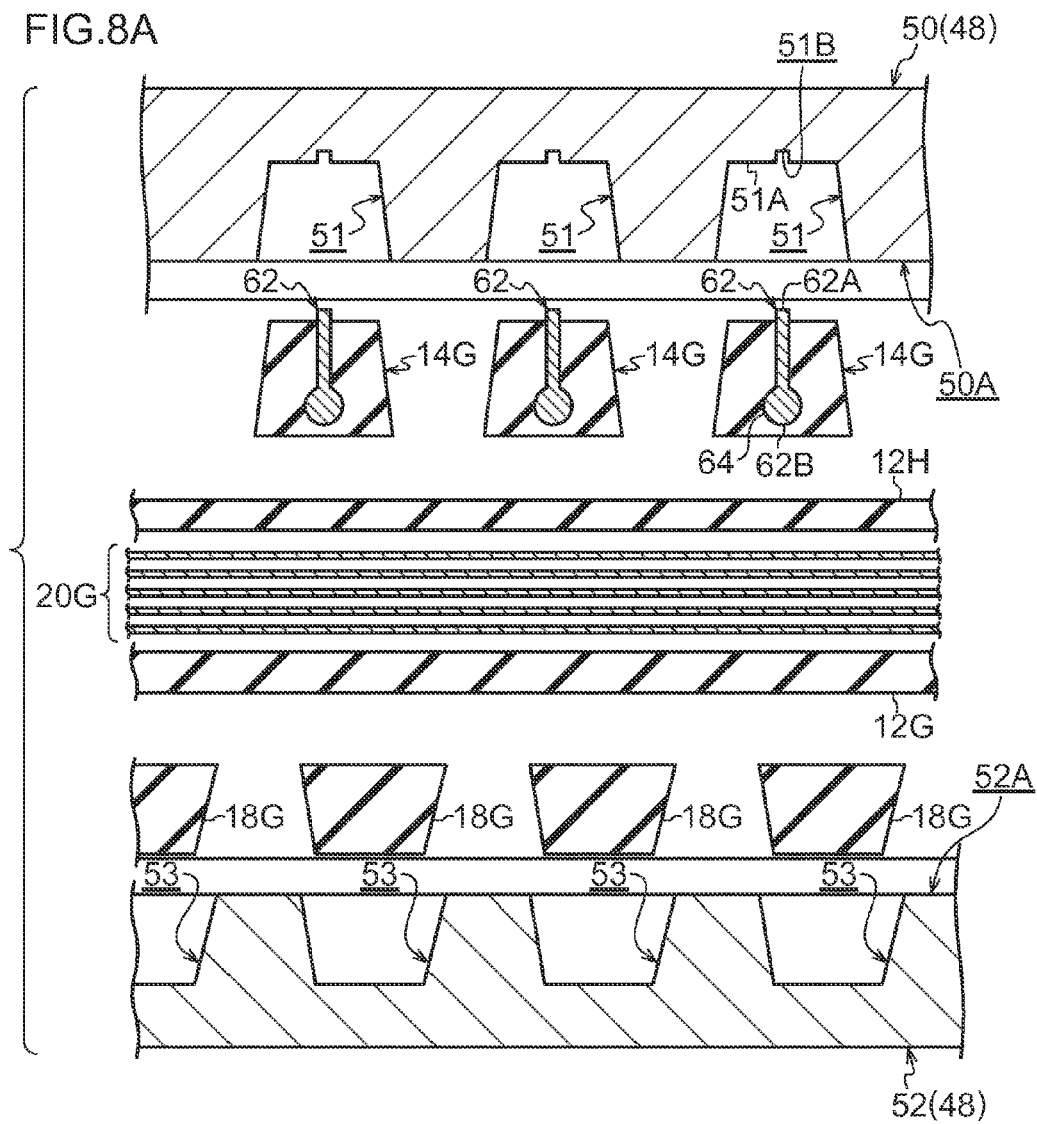
FIG. 8A is an explanatory diagram to explain a vulcanization process in a rubber crawler manufacturing method of the second exemplary embodiment.

Next, the rubber crawler configuration members manufactured in the rubber crawler configuration member manufacturing process described above are vulcanized in the mold 48, serving as an example of a vulcanization mold (see FIG. 8A).

Explanation follows regarding the mold 48. The mold 48 is configured from the upper mold 50 and the lower mold 52. A recess 50A for molding the inner peripheral side of the rubber crawler 10 is formed at a mating face of the upper mold 50. The recess 50A is formed with rubber projection recesses 51 of substantially the same shape as the rubber projections 14, for molding the rubber projections 14. Bottom faces 51A of the rubber projection recesses 51 are formed with positioning recesses 51B into which the one end portions 62A of the metal members 62 are inserted. A recess 52A for molding the outer peripheral side of the rubber crawler 10 is formed at a mating face of the lower mold 52. The recess 52A is formed with lug recesses 53 of substantially the same shape as the lugs 18, for molding the lugs 18.

Next, explanation follows regarding the vulcanization procedure using the mold 48.

As illustrated in FIG. 8A, first, the unvulcanized rubber lug pieces 18G are disposed in (fitted into) the lug recesses 53 of the lower mold 52, and the respective members of the unvulcanized rubber sheet 12G, the unvulcanized belt plies 20G, and the unvulcanized rubber sheet 12H are disposed (stacked) thereon, in that sequence.

Figure 8B:
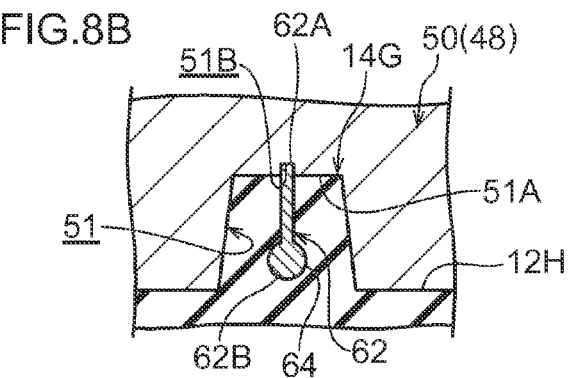
FIG. 8B is an explanatory diagram to explain a state in which a rubber projection piece has been set in a mold in the second exemplary embodiment.

Next, as illustrated in FIG. 8A and FIG. 8B, the one end portions 62A of the metal members 62 are inserted into the positioning recesses 51B of the upper mold 50, while disposing (fitting) the unvulcanized rubber projection pieces 14G into the rubber projection recesses 51, and the upper mold 50 and the lower mold 52 are closed.

Vulcanization is then performed at a specific temperature and for a specific duration in a state in which the upper mold 50 and the lower mold 52 apply a specific pressure to the rubber crawler configuration members.

After vulcanization has finished, the upper mold 50 and the lower mold 52 are opened up, and the end-shaped rubber crawler formed by vulcanizing the rubber crawler configuration members is removed. Both length direction end portions of the end-shaped rubber crawler are then overlaid with one another, and the overlaid portions are coupled and joined together. The endless rubber crawler 60 is thereby manufactured.

In the present exemplary embodiment, configuration is made in which the rubber crawler configuration members are stacked in sequence in the lower mold 52; however, the present invention is not limited thereto. The upper mold 50 and the lower mold 52 may be inverted, and the rubber crawler configuration members may be stacked in sequence in the upper mold 50.

Next, explanation follows regarding operation and advantageous effects of the rubber crawler manufacturing method of the present exemplary embodiment.

In the rubber crawler manufacturing method described above, the plural rubber segment pieces 15G are formed, with the fitting recesses 17G, into which the metal members 62 are fitted, formed in the segment faces 15GA. Next, in the rubber projection piece assembly process, the segment faces 15GA of the plural rubber segment pieces 15G are joined together while fitting the metal members 62 into the fitting recesses 17G of the rubber segment pieces 15G to assemble the respective rubber projection pieces 14G. The rubber projection pieces 14G are then vulcanized in the vulcanization process to form the rubber projections 14 that project out from the inner periphery of the rubber crawler 60 with the metal members 62 embedded therein.

Due to joining together the segment faces 15GA of the plural rubber segment pieces 15G while fitting the metal members 62 into the fitting recesses 17G of the rubber segment pieces 15G to assemble the rubber projection pieces 14G, the metal members 62 that have better thermal conductivity than the rubber material can be disposed with high precision in the unvulcanized rubber projection pieces 14G that form the rubber projections 14 after vulcanization.

Since the metal members 62 can be disposed at their desired positions in the rubber projection pieces 14G, heat can be transmitted substantially evenly in the rubber projection pieces 14G during vulcanization, and the vulcanization temperature of the rubber projection pieces 14G can be raised to increase the speed at which vulcanization progresses. Namely, the speed at which vulcanization of all the rubber crawler configuration members progresses can be increased. This thereby enables a reduction in vulcanization time. There is accordingly a reduction in electricity consumption and the like during manufacture of the rubber crawler, and manufacturing costs of the rubber crawler 60 can be reduced.

As illustrated in FIG. 6 and FIG. 7, in the rubber crawler manufacturing method described above, the rubber segment pieces 15G are formed such that the join L between the segment faces 15GA of adjacent rubber segment pieces 15G is positioned at wall faces other than the width direction wall faces 14B of the rubber projection 14 (at the peripheral direction wall faces 14C, the apex face 14A, and the bottom face 14D). In other words, the rubber segment pieces 15G are formed such that the join L is not formed on the wall faces at the width direction wall faces 14B of the rubber projection 14.

Due to this configuration, the drive wheel 100 and the idle wheel 102 do not directly contact the join L of the segment faces 15GA, even when the drive wheel 100 and the idle wheel 102 contact the width direction wall faces 14B of the rubber projection 14 during turning. This thereby enables the occurrence of defects (such as cracks along the segment faces 15GA) caused by the join L of the segment faces 15GA to be suppressed.

The segment faces 15GA of adjacent rubber segment pieces 15G are joined firmly together during vulcanization due to coating an adhesive employing a diene-based polymer on the segment faces 15GA of the rubber segment pieces 15G, thus enabling the occurrence of defects originating at the join L of the adjacent rubber segment pieces 15G to be effectively suppressed in the rubber projection 14 after vulcanization.

The one end portions 62A of the metal members 62 are inserted into the positioning recesses 51B of the upper mold 50 before vulcanization of the projection rubber pieces 14G, thereby enabling heat from the upper mold 50 to be transmitted through the metal members 62 to deep within (a deep portion of) the rubber projection pieces 14G during vulcanization. This thereby enables the speed at which vulcanization of the rubber projection pieces 14G progresses to be increased, enabling an effective reduction in vulcanization time.

In particular, since large-scale agricultural machinery and paving machinery requires large size rubber projections 14 such as in the rubber crawler 60 of the present exemplary embodiment (for example, the projection height of the rubber projection 14 has a greater value than the thickness of the rubber belt 12), there is a tendency toward long vulcanization times. However, disposing the metal members 62 in the rubber projection pieces 14G as described above enables a reduction in the vulcanization time.

The one end portions 62A of the metal members 62 are inserted into the positioning recesses 51B of the upper mold 50, thereby enabling easy positioning of the metal members 62 in the upper mold 50, and also enabling positional displacement of the metal members 62 due to the flow of rubber during vulcanization to be prevented.

As illustrated in FIG. 5, in the second exemplary embodiment, the bulbous portion 64 of the metal member 62 is formed in a substantially spherical shape: however, the present invention is not limited thereto. For example, the bulbous portion 64 of the metal member 62 may be configured in a substantially triangular pyramid shape, or may be configured in a substantially circular column shape.

As illustrated in FIG. 5, in the second exemplary embodiment, the bulbous portion 64 serving as an anti-removal portion that suppresses pull-out of the metal member 62 from the rubber projection 14 is formed to the portion of the metal member 62 that is embedded in the rubber projection 14. However, the present invention is not limited thereto, and, for example, the other end portion in the extension direction of the metal member 62 may be bent, with the bent portion configuring an anti-removal portion.

As illustrated in FIG. 7, in the rubber crawler manufacturing method of the second exemplary embodiment, the one end portion 62A of the metal member 62 is configured projecting out from the apex face of the rubber projection piece 14G; however, the present invention is not limited thereto. The one end portion 62A of the metal member 62 may be configured so as not to project out from the apex face of the rubber projection piece 14G.

As illustrated in FIG. 7, in the rubber crawler manufacturing method of the second exemplary embodiment, only the fitting recesses 17G are formed in the segment faces 15GA of the rubber segment pieces 15G; however, the present invention is not limited thereto, and other recessed and raised portions may be formed in the segment faces 15GA of the rubber segment pieces 15G. For example, a raised portion may be formed to the segment face 15GA of one rubber segment piece 15G, and a recess into which the raised portion is fitted may be formed to the segment face 15GA of the other rubber segment piece 15G. In such cases, fitting the raised portion on the one rubber segment piece 15G into the recess on the other rubber segment piece 15G enables simple and precise assembly of the rubber projection pieces 14G. The raised portion and the recess moreover suppress displacement of the rubber projection pieces 14G along the segment faces 15GA. This enables the occurrence of positional displacement and the like to be suppressed between the rubber segment pieces 15G with adjoining segment faces 15GA during transportation of the rubber projection pieces 14G or the like. Displacement along the segment faces 15GA (join L) is also suppressed in the rubber projection 14 after vulcanization, thereby enabling the occurrence of defects originating at the join L to be further suppressed.

Both raised portions and recesses may be formed to the segment faces 15GA, such that the two rubber segment pieces 15G have the same shape as each other. In such cases, the number of different members configuring the rubber projection pieces 14G can be reduced, thereby enabling a reduction in manufacturing costs.

As illustrated in FIG. 7, in the rubber crawler manufacturing method of the second exemplary embodiment, each rubber projection piece 14G is configured from two rubber segment pieces 15G; however, the present invention is not limited thereto, and the rubber projection pieces 14G may be configured from three or more rubber segment pieces. In such cases, respective metal members are preferably disposed in the segment faces of the respective rubber segment pieces. Such a configuration enables vulcanization to be performed substantially evenly across the respective rubber segment pieces, thereby enabling the speed at which vulcanization of the rubber projection pieces 14G progresses to be increased. Since plural metal members are embedded in the rubber projection 14 after vulcanization, the rigidity of the rubber projection 14 in the crawler peripheral direction and the crawler width direction is increased, enabling the occurrence of defects around the rubber projection 14 to be suppressed.

As illustrated in FIG. 7, in the rubber crawler manufacturing method of the second exemplary embodiment, the rubber projection pieces 14G are segmented into two in the crawler width direction; however, the present invention is not limited thereto, and, for example, the rubber projection pieces 14G may be segmented into plural parts in the crawler in-out direction. In such cases, the rubber segment pieces 15G are preferably formed such that the join L between the segment faces 15GA is formed only at a bottom face of the rubber projection piece 14G. Such a configuration enables the wheels to be reliably prevented from making direct contact with the join L of the rubber projection 14. This thereby enables the occurrence of cracks and the like originating at the join L of the rubber projection 14 to be effectively suppressed.

In the second exemplary embodiment, the substantially spherical shaped bulbous portion 64 is formed to the other end portion 62B of the metal member 62; however, the present invention is not limited thereto, and the other end portion of the metal member 62 may be of any shape as long as it can be suppressed from coming out from the rubber projection. The metal member may also be formed with a circular column shape with a uniform diameter from one end to the other end, without providing a portion to suppress removal of the metal member from the rubber projection.

In the exemplary embodiments described above, configuration is made in which the metal member that has better thermal conductivity than the rubber material is disposed in the rubber projection piece; however, the present invention is not limited thereto. For example, a member formed from a material with better thermal conductivity than the rubber material may be disposed in place of the metal member.

Although the present invention has been explained with the use of the exemplary embodiments, these exemplary embodiments are merely examples, and various modifications may be implemented within a range not departing from the spirit of the present invention. Obviously, the scope of rights encompassed by the present invention is not limited by these exemplary embodiments.

The invention claimed is:

1. A rubber crawler comprising:
an endless rubber body entrained around a plurality of wheels;
a plurality of rubber projections that are formed at the rubber body at intervals around a peripheral direction of the rubber body, that project toward an inner peripheral side of the rubber body, and that limit movement of the wheels in a rubber body width direction through contact; and
at least one metal member embedded in each rubber projection, the at least one metal member raising a rigidity of the rubber projection in the rubber body width direction, and including a portion that is exposed from the rubber projection; wherein,
in each rubber projection, the at least one metal member extends from an apex face side to a base side of the rubber projection, with one end portion in an extension direction of the at least one metal member exposed from the apex face of the rubber projection, and with another end portion in the extension direction of the metal member at a position lower than half of a projection height of the rubber projection.

2. The rubber crawler of claim 1, wherein, in each rubber projection, the one end portion in the extension direction of the at least one metal member projects out from the apex face of the rubber projection.

3. The rubber crawler of claim 1, wherein, in each rubber projection, a portion of the at least one metal member that is embedded in the rubber projection is formed with an anti-removal portion to suppress pull-out of the at least one metal member from the rubber projection.

4. The rubber crawler of claim 1, wherein, in each rubber projection, an outer periphery of the at least one metal member has a curved line profile in cross-section taken along a direction orthogonal to the extension direction.

5. The rubber crawler of claim 1, wherein, in each rubber projection, a plurality of metal members are embedded in the rubber projection at intervals in the rubber body width direction.

6. A rubber crawler manufacturing method to manufacture the rubber crawler of claim 1, the rubber crawler manufacturing method comprising:
a rubber segment piece forming process of forming, for each rubber projection, a plurality of rubber segment pieces of an unvulcanized rubber projection piece that will form the rubber projection segmented at least one position where the at least one metal member will be embedded;
a rubber projection piece assembly process of assembling, for each rubber projection, the rubber projection piece by joining segment faces of the plurality of rubber segment pieces together while fitting the at least one metal member into respective fitting recesses formed in the segment face of each of the rubber segment pieces; and a vulcanization process of vulcanizing, for each rubber projection, the rubber projection piece to form the rubber projection.

7. The rubber crawler manufacturing method of claim 6, wherein, in each rubber projection, the rubber segment pieces are formed such that a connection between the segment faces of adjacent rubber segment pieces is positioned at a wall face other than wall faces of the rubber projection at the rubber crawler width directions.

8. The rubber crawler manufacturing method of claim 6, wherein recessed and raised portions that fit together with each other are formed at the segment faces of the adjacent rubber segment pieces.

9. The rubber crawler manufacturing method of claim 6, wherein an adhesive employing a diene-based polymer is coated on the segment faces of the rubber segment pieces.

10. The rubber crawler manufacturing method of claim 6, wherein, in each rubber projection:
   each fitting recess of the rubber segment pieces is formed such that a portion of a metal member fitted therein projects out from an apex face of the rubber projection; and
   the rubber projection piece is vulcanized with a portion of the at least one metal member, that projects out from the rubber projection piece after assembly, inserted into a positioning recess formed in a vulcanization mold.

* * * * *